(12) United States Patent
Zhao et al.

(10) Patent No.: US 6,694,398 B1
(45) Date of Patent: Feb. 17, 2004

(54) CIRCUIT FOR SELECTING INTERRUPT REQUESTS IN RISC MICROPROCESSORS

(75) Inventors: Sheng Zhao, Conquitlam (CA); Aries Wong, Vancouver (CA); Minghui Lin, Richmond (CA)

(73) Assignee: Nokia Corporation, Espoo (FI)

( * ) Notice: Subject to any disclaimer, the term of this patent is extended or adjusted under 35 U.S.C. 154(b) by 425 days.

(21) Appl. No.: 09/843,716

(22) Filed: Apr. 30, 2001

(51) Int. Cl.[7] .......................... G06F 13/24; G06F 13/26
(52) U.S. Cl. ........................... 710/260; 710/264
(58) Field of Search ................... 710/260–269

(56) References Cited

U.S. PATENT DOCUMENTS

| | | | | |
|---|---|---|---|---|
| 4,035,780 A | * | 7/1977 | Kristick et al. | 710/244 |
| 5,313,640 A | * | 5/1994 | Beardsley et al. | 710/260 |
| 5,594,905 A | * | 1/1997 | Mital | 710/260 |
| 5,892,957 A | * | 4/1999 | Normoyle et al. | 710/263 |
| 5,937,199 A | * | 8/1999 | Temple | 710/262 |
| 5,940,610 A | * | 8/1999 | Baker et al. | 713/600 |
| 6,470,407 B1 | * | 10/2002 | Losi | 710/264 |
| 6,499,078 B1 | * | 12/2002 | Beckert et al. | 710/260 |

* cited by examiner

Primary Examiner—Xuan M. Thai
(74) Attorney, Agent, or Firm—Antonelli, Terry, Stout & Kraus, LLP

(57) ABSTRACT

An apparatus and method for prioritizing interrupt requests in a RISC processor. By utilizing hardware to prioritize the requests, processor time is reduced. The acknowledge signal from a priority resolve circuit selects the given service routine entry to branch instruction generating circuit. A lower priority service routine can be interrupted by a higher priority request.

12 Claims, 7 Drawing Sheets

# CIRCUIT FOR SELECTING INTERRUPT REQUESTS IN RISC MICROPROCESSORS

BACKGROUND OF THE INVENTION

1. Field of the Invention

The present invention relates to a device for selecting interrupt requests in a microprocessor, and more particularly to a device for selecting the highest priority interrupt request and controlling the application of the request to a RISC-based microprocessor.

2. Discussion of the Background

One type of microprocessor that is currently being used with great success is a RISC-based microprocessor. In this type of architecture, a reduced instruction set is used so that chip complexity is reduced. In these types of devices, software routines perform complex instructions that were previously done in hardware by computers that used more complex instruction sets. As a result, the microcode layer and associated overhead has been eliminated. This type of system is faster and more economical than those using more complex instructions.

One such system is described in the ARM7TDMI datasheet issued August 1995, which is hereby incorporated by reference. This system has been developed by Advanced RISC Machines, Ltd. In this system, eight exceptions are available. These include two interrupts, the FIQ (fast interrupt request) and the IRQ (interrupt request), the prefetch abort, the data abort, the reset, the software interrupt, the undefined instruction, and the branch with link. Thus, two of the exceptions are used as interrupts.

Since it is possible to have more than one of each type of interrupt request, so that it is necessary to select which interrupt should be given priority. In current systems a selecting circuit is used to prioritize the interrupt requests. An interrupt service routine polls the status of the two types of interrupts to determine which request should be served. However, if there are many interrupt requests, and they occur frequently, it takes considerable CPU time to poll the various requests. Accordingly, it is desirable to find a system which reduces the necessary CPU time to establish priority.

SUMMARY OF THE INVENTION

Accordingly, the present invention provides a method for prioritizing interrupt requests in a RISC microprocessor.

The present invention further provides an apparatus for prioritizing interrupt requests in a RISC microprocessor.

The present invention also provides a system utilizing hardware to prioritize interrupt requests in a RISC microprocessor.

The present invention still further provides a system for prioritizing interrupt requests utilizing a branch instruction based on a vector using a RISC microprocessor.

The present invention still further provides a system for prioritizing interrupt requests in a RISC microprocessor, which implements an acknowledge vector as a register.

The present invention further provides a system for prioritizing interrupt requests utilizing separate arbitrators for two different types of interrupts.

Briefly, this is achieved by providing a selector and control device which receives interrupt requests with two outputs for the two types of requests connected to corresponding arbitrators. An address from an interrupt vector is selected based on priority and a corresponding signal is sent to the CPU.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
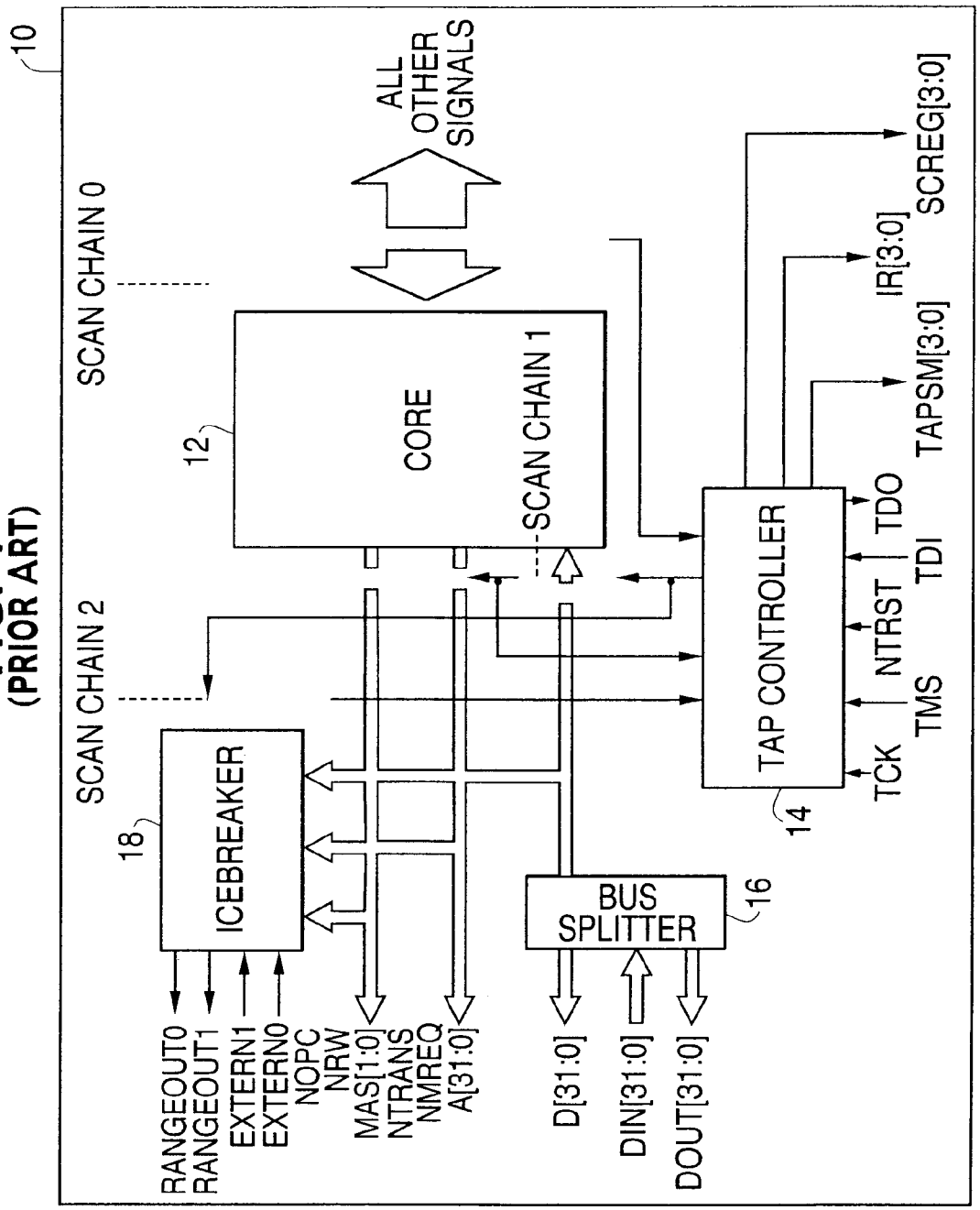
FIG. 1 shows a block diagram of a prior art RISC processor.

Referring now to the drawings wherein like reference numerals designate identical or corresponding parts throughout the several views, and more particularly to FIG. 1, thereof, wherein a block diagram of a microprocessor 10 is shown. This microprocessor is described in the aforementioned datasheet ARM7TDMI. This device includes a core 12, as well as other circuits, such as a TAP controller 14, a bus splitter 16 and an ICEBreaker 18. The functions of the circuits other than the core are not relevant to the present invention and are described in the aforementioned datasheet, which is incorporated by reference.

Figure 2:
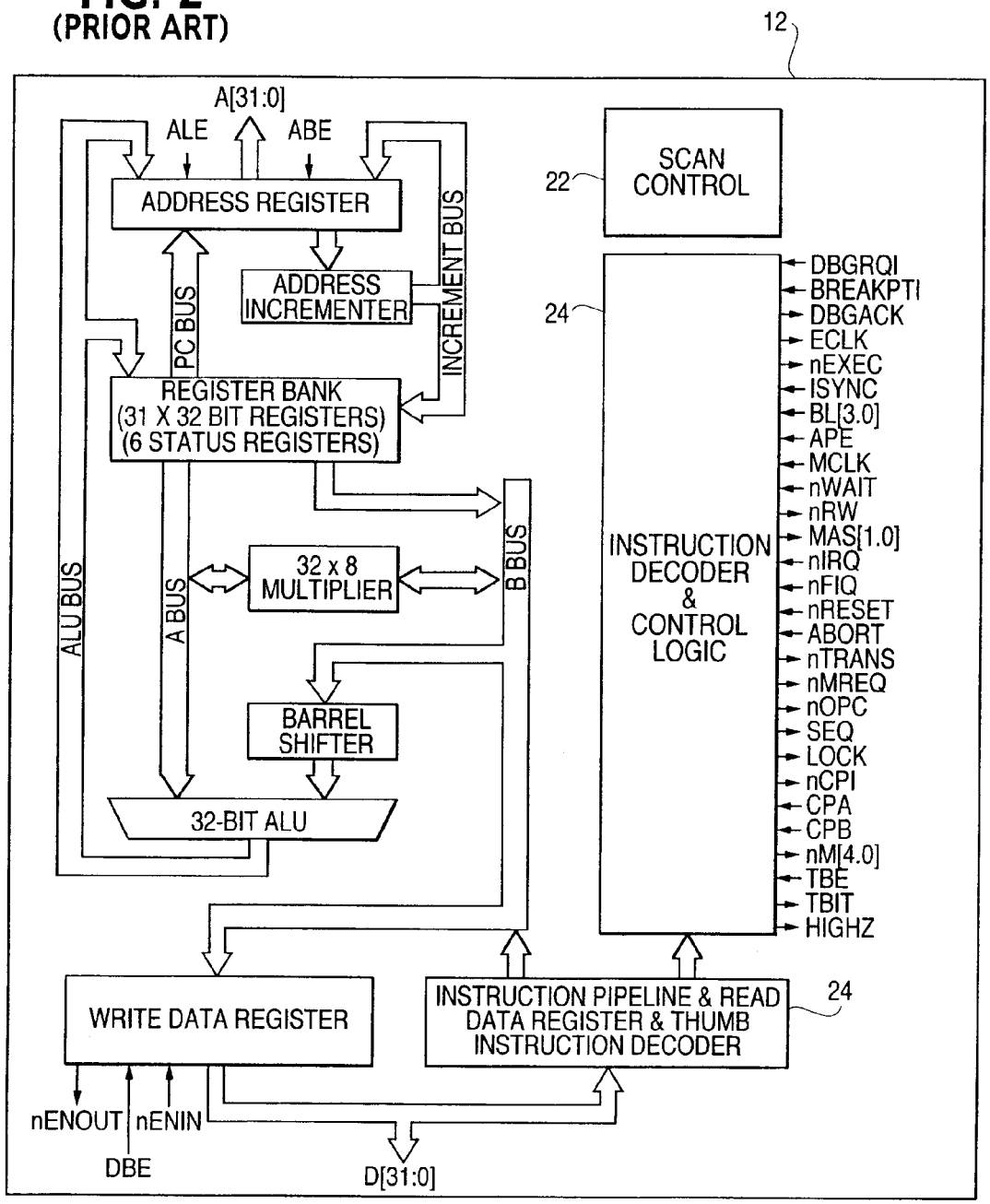
FIG. 2 shows a block diagram of the core shown in FIG. 1.

FIG. 2 is a block diagram of the core 12, and includes an instruction decoder and control logic 20, which receives and transmits a large number of control signals including both interrupt signals, nIRQ and nFIQ. This core includes other devices, such as a scan control 22, an instruction pipeline 24 and other registers and arithmetic units. These various elements are likewise described in the aforementioned datasheet, which is incorporated by reference.

Figure 3:
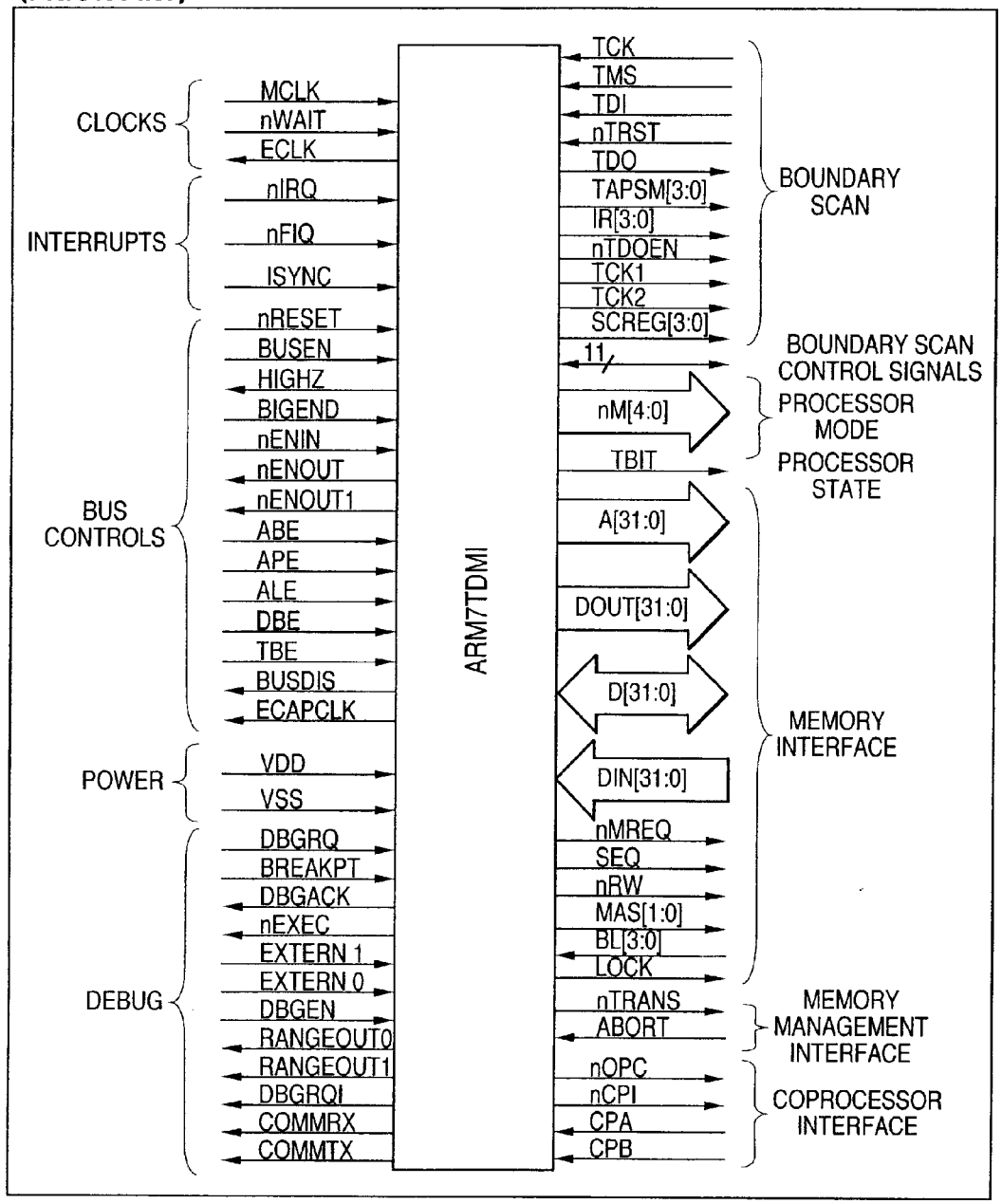
FIG. 3 shows a functional diagram of the processor shown in FIG. 1.

FIG. 3 shows a functional diagram of the device shown in FIG. 1. Thus, this figure shows the various signals grouped by function which are received as inputs and sent out as outputs. Of particular interest are the interrupts shown on the upper left side of the circuit, including the nIRQ and nFIQ signals.

Figure 4:
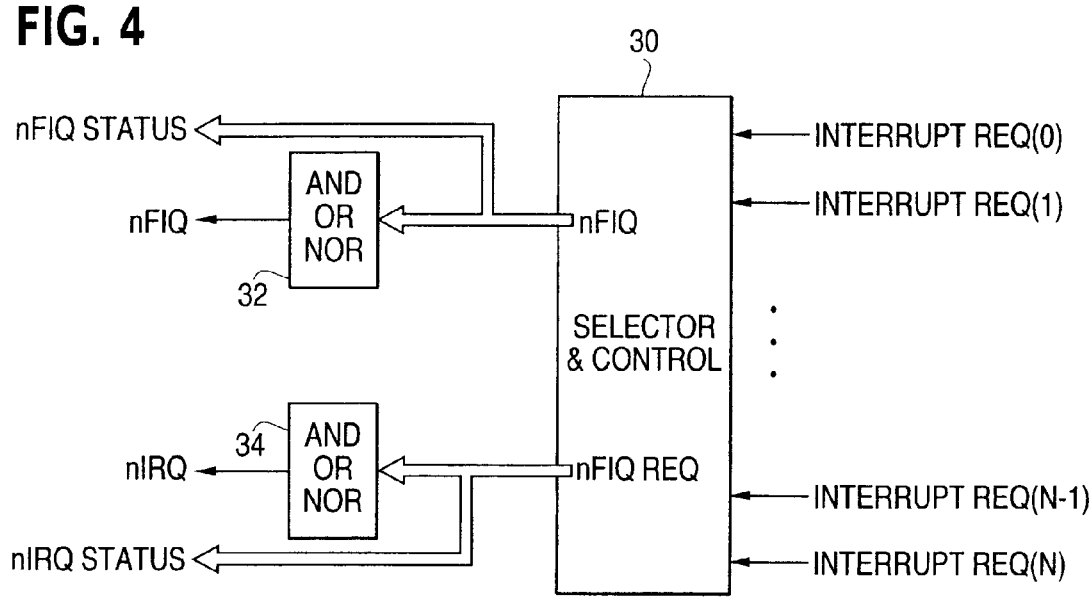
FIG. 4 is a block diagram of a control circuit using standard polling techniques.

FIGS. 1–3 show the basic structure of a typical microprocessor which may be used with the present invention. FIG. 4 shows an interrupt circuit which can be used with the processor described in FIGS. 1–3. The interrupt circuit includes a selector and control circuit 30, which receives a series of interrupt requests. The selector and control device determines whether the interrupt request is an FIQ or IRQ request and forwards the request to the proper output. It can also enable or disable the interrupt request. Thus, this device not only forwards the request to the correct output, but also controls when it is enabled. It should be noted that the two outputs from the selector and control circuit are shown as wide lines compared to the narrow lines which are used as inputs to the same circuit. The wide line indicates that there is a signal of more than one bit. Thus, the outputs of the selector and control may have as many as n+1 bits to reflect the interrupt requests 0–n. Each output of the selector and control circuit is sent to a separate gate circuit 32 or 34. These circuits perform an AND function (for active low implementation) or a NOR function (for active high implementation). These gating circuits have outputs nFIQ and nIRQ, which are sent to the processor which receives them as inputs as shown in FIGS. 1–3. Between the selector and control circuit and the logic circuits, the signal line is branched so as to provide nFIQ status and nIRQ status signals. These signals have multiple bits as indicated by the wider lines and indicate the interrupt requests.

In this type of system, the interrupt status is done by polling in the processor. The polling is a software procedure which reads the interrupt status and checks each bit according to a given priority. Based on the priority, it jumps to a related interrupt service program. For example, interrupt request (0) has the highest priority, followed by interrupt request (1), interrupt request (2), etc. The interrupt service program first checks interrupt request (0) when polling and if there is an interrupt request on this line, it will jump to the interrupt request (0) service program. If there is no request on this line, interrupt request (1) will be checked and so on. In this way, if more than one interrupt request is present at the same time, the request with the higher priority will be served first. Under this type of device, if there are many interrupt request sources and requests are generated frequently, it requires too much processor time to poll the requests. In order to avoid this problem, a hardware device can be used to resolve the priority and jump to the related interrupt service routine, which will provide a faster and easier implementation.

Figure 5:
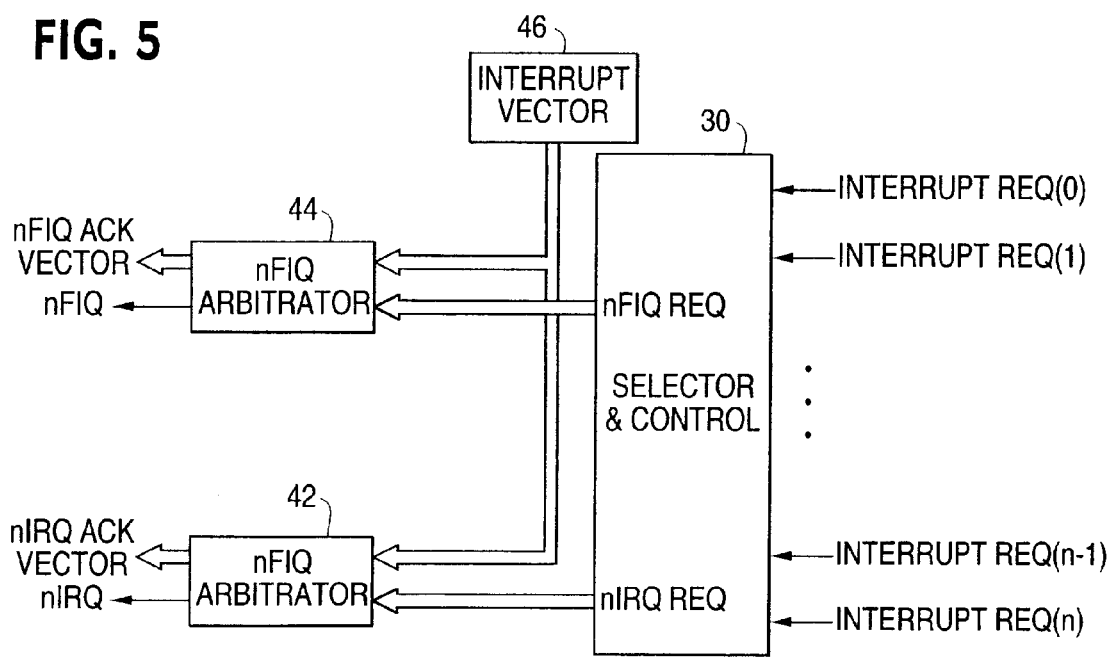
FIG. 5 is a block diagram showing the interrupt circuit of the present invention.

FIG. 5 is a block diagram of the interrupt circuit according to the present invention. This device includes a selector and control circuit 30, which is the same as the device shown in FIG. 4. However, instead of logic circuits, two arbitrator circuits 42 and 44 are shown as receiving the outputs from the selector and control circuit. In addition to this input, the arbitrators receive an input from interrupt vector 46. This signal is the group of interrupt service program entry addresses for the interrupt requests. Since each interrupt request has its own interrupt service program, there are n+1 addresses in the interrupt vector. When interrupt requests are received, they are selected to the two output lines by the selector and control circuit 30, in a similar fashion to that shown in FIG. 4. However, no matter how many interrupt requests are received, each arbitrator will generate only one output for the interrupt request with the highest priority and along with it will send the address of the interrupt service program for that interrupt as the Ack Vector. Accordingly, arbitrator 42 generates the signal nIRQ and nIRQAck Vector. Likewise, arbitrator 44 generates nFIQ and nFIQAck Vector signals. The nIRQ and nFIQ signals are received as inputs in the processor as previously indicated. At the same time, the Ack Vector signal is received as the interrupt service program entry address. By utilizing this system where the address is generated along with the signal, it is not necessary for the processor to poll the various requests and to generate an address according to the selected interrupt. Instead, the interrupt and the associated address are generated outside the processor so that processor time is minimized.

The interrupt vector 46 includes a series of address registers to store the interrupt service program entry addresses for each interrupt request. The arbitrators select one address from the interrupt vector based on the priority and outputs this address along with the interrupt request signal.

Figure 6:
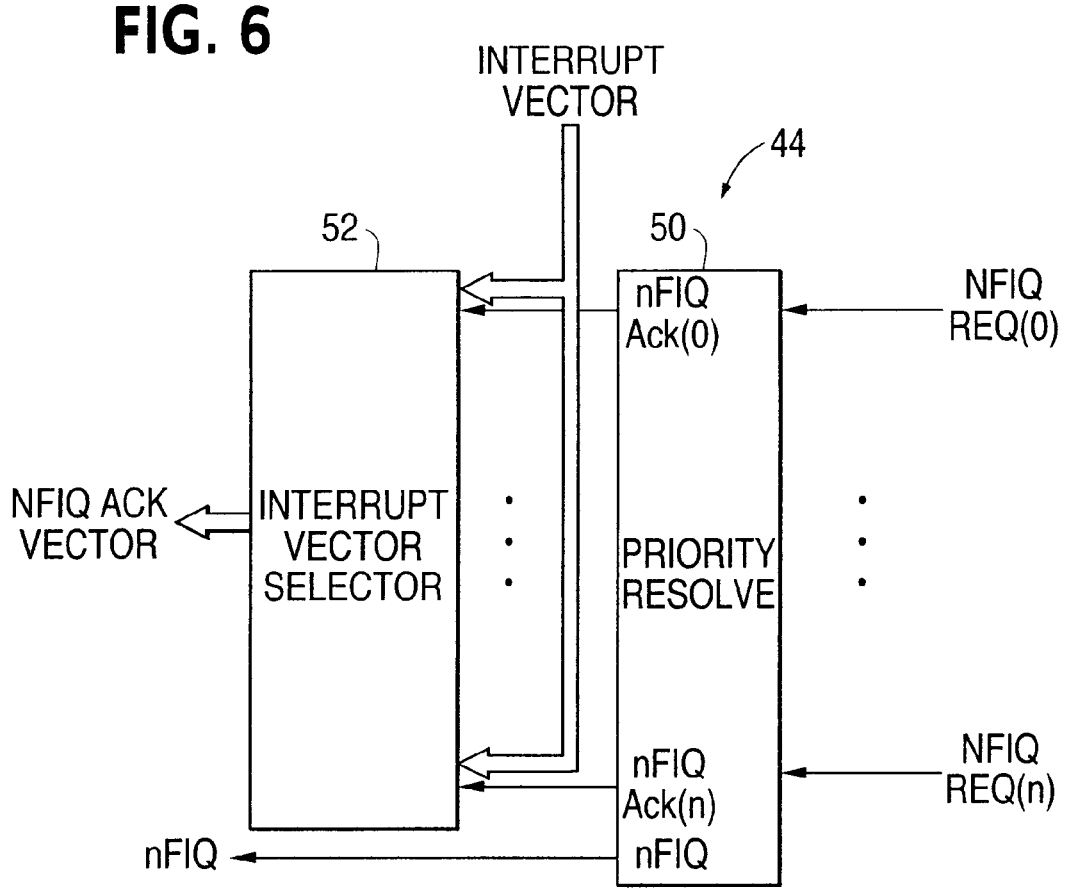
FIG. 6 is a block diagram of the arbitrator shown in FIG. 5.

FIG. 6 is a block diagram of arbitrator 44. Arbitrator 42 is identical to the shown arbitrator. The arbitrator includes a priority resolve circuit 50, which determines the priority of the incoming requests. The incoming requests are only those which are FIQ requests and are included in the output of the selector and control circuit 30. The priority resolve circuit outputs an nFIQ signal to the processor and also outputs Ack signals as outputs to the interrupt vector selector 52. The interrupt vector selector also receives the interrupt vector signals from the interrupt vector 46 as shown in FIG. 5. According to the acknowledge signals, one of the addresses from the interrupt vector signal is selected by interrupt vector selector 52 and placed on output nFIQAck Vector which carries the interrupt service program entry address as described in regard to FIG. 5.

Figure 7:
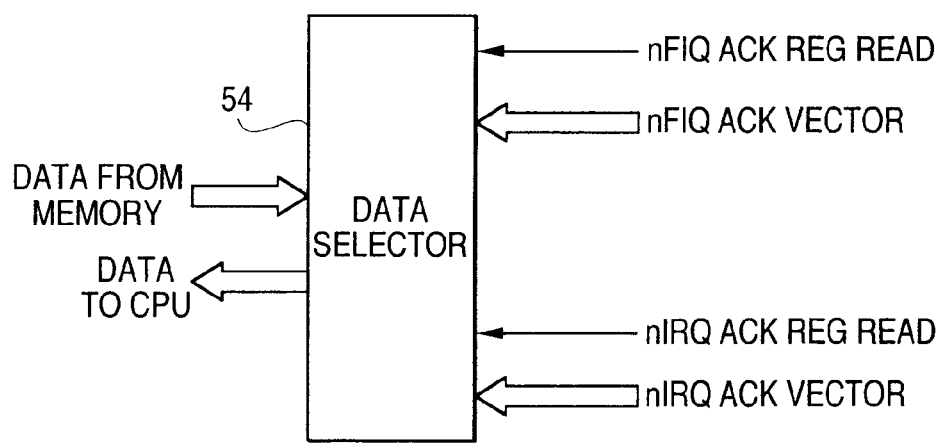
FIG. 7 is a block diagram of one implementation of the present invention.

FIG. 7 shows the first of two implementations for passing the acknowledge vector to the processor. Normally, the processor reads an instruction or data from memory. In the present invention, a special instruction or data is provided to the processor when the processor reads a special address. In the first implementation, the data selector 54 receives the acknowledge vectors from both arbitrators 42 and 44. The data selector implements the acknowledge vector as a register, the service routine reads this register and jumps to the interrupt service routine. There is no limitation for the interrupt service routine entry address and the routine can be in either of the two modes described in the aforementioned datasheet for the processor. More specifically, the acknowledge vector has two registers: nFIQAckREG for nFIQ and nIRQAckREG for nIRQ. The processor reads nFIQAckREG on the nFIQ response and nIRQAckREG on the nIRQ response and jumps to the interrupt routine using a branch and exchange instruction. If the processor reads nFIQAckREG, the nFIQ Ack Vector will be passed to the processor. If the processor reads nIRQAckREG, the nIRQ Ack Vector will be passed to the processor. Otherwise, data from the memory is passed to the processor. In other words, if no interrupt is received, the data from memory is sent to the processor, but if an interrupt is received, the corresponding address is sent to the processor.

Figure 8:
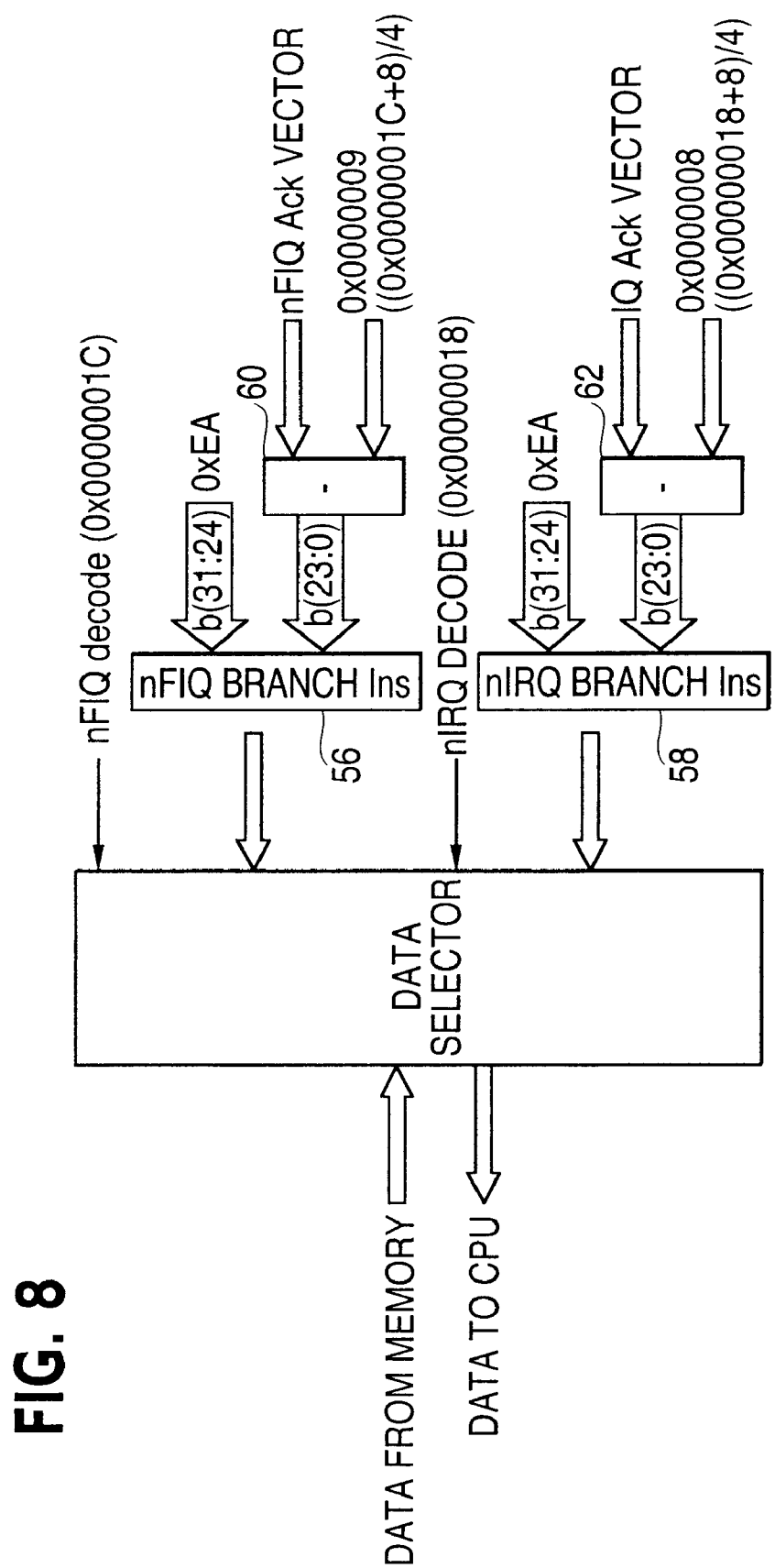
FIG. 8 is a block diagram of a second implementation of the present invention.

FIG. 8 shows the other implementation to pass the acknowledge vector to the processor. This implementation generates branch instruction based on the acknowledge vector at specific addresses for the interrupts and jumps to the interrupt routine directly. The data selector 54 receives data from memory and sends data to the processor in the same fashion as FIG. 7. However, the two acknowledge vectors are connected to corresponding subtraction circuits 60 and 62. Since the processor reserves just one word for each exception, the service program cannot be started from that address. Usually a branch instruction is in that address and the service program jumps to the service program from that address. The branch instruction is a relative jump, that is, a jump forward or backward by a given offset. The other inputs to subtractor circuits 60 and 62 indicate these offsets. The output of the subtractor circuits 60 and 62 are used as inputs to the branch instruction circuits 56 and 58, respectively. The other input to each of these is 0xEA, which indicates a branch without link instruction. This instruction is described in the aforementioned datasheet for the processor. The data selector 54 switches the output data to the processor from three choices, the data received from the memory, the nFIQ branch instruction and the nIRQ branch instruction. If the processor accesses address 0x0000001C, a nFIQ branch instruction is passed to the processor. If the processor accesses address 0x00000018, a nIRQ branch instruction will be passed to the processor. Otherwise, data from the memory will be passed to the processor.

Figure 9:
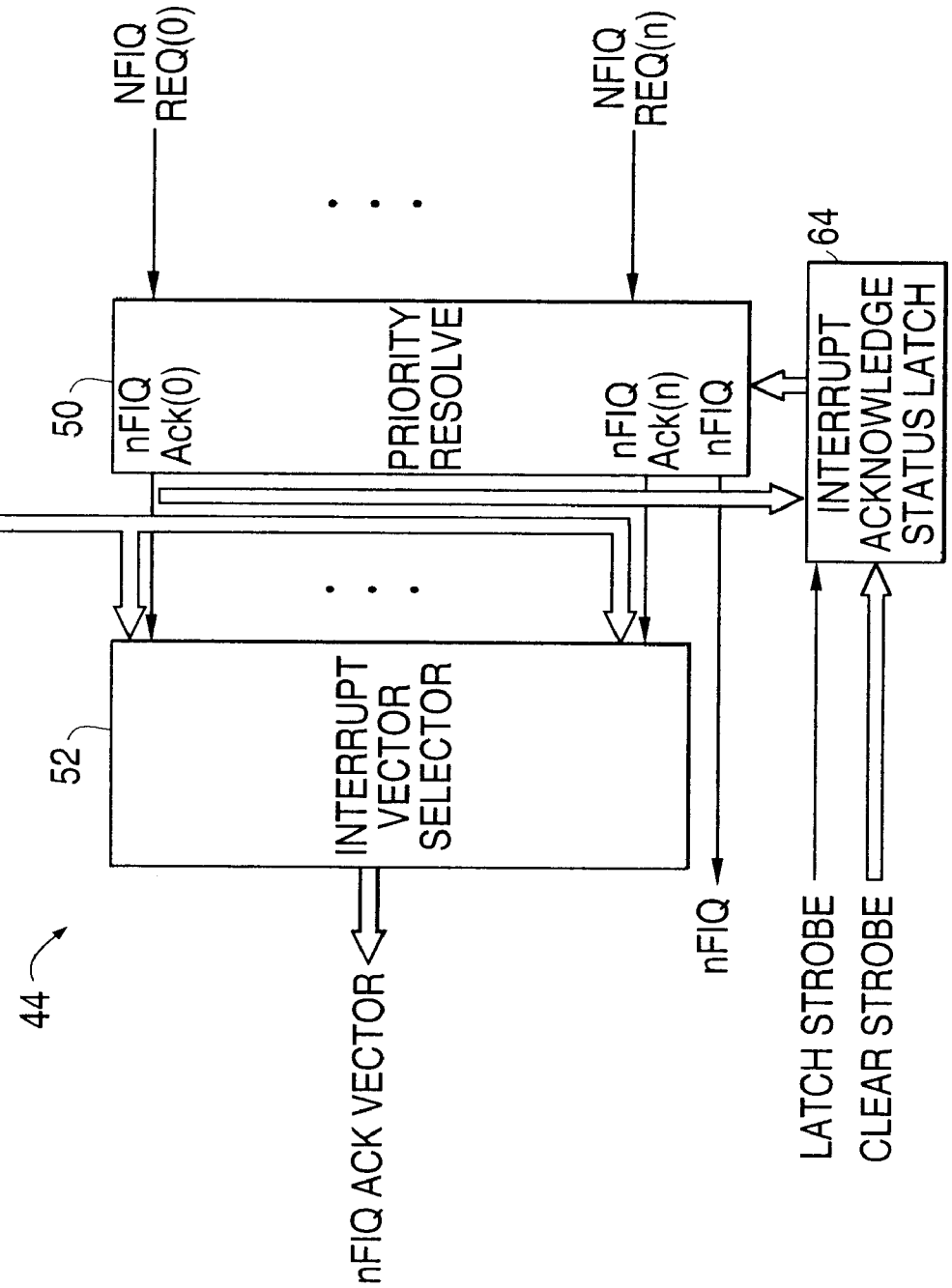
FIG. 9 is a modification of the device shown in FIG. 6 for use with a multi-level interrupt.

FIG. 9 shows an arbitrator 44, which is similar to FIG. 6, but which is modified so as to have a multi-level interrupt. For this type of system, the higher priority interrupt requests must interrupt a lower priority interrupt service program. This multiple level can be within the nFIQ or nIRQ group of interrupt requests. In this arrangement, the interrupts are still received in the priority resolve circuit 50 and a series of outputs are sent from there to the interrupt vector selector 52 along with interrupt vector signals from interrupt vector 46. However, this device also includes an interrupt acknowledge status latch 64, which receives a latch strobe and clear strobe signal and which generates an output to the priority resolve 50. The interrupt acknowledge status latch circuit latches the acknowledge status on an interrupt response. The latch status feeds back to the priority resolve circuit in order to mask the lower priority interrupt request. For the implementation shown in FIG. 7, the latch strobe is nFIQAckREG read for nFIQ and is nIRQAckREG read for nIRQ. For the implementation of FIG. 8, the latch strobe is nFIQ decode (0x00000018) for nFIQ and is nIRQ decode (0x0000001C) for nIRQ. For nFIQ service routine, R14__fiq and SPSR__fiq need to be saved to memory or implemented registers and F bit in CPSR needs to be cleared to enable a higher level interrupt request. R14__fiq and SPSR__fiq need to restored and the latched acknowledge bit needs to be cleared to enable a lower level priority interrupt request on exit. For nIRQ service routine, R14__irq and SPSR__irq need to be saved to memory or implemented registers and I bit in CPSR needs to be cleared to enable a higher level interrupt request. R14__irq and SPSR __irq need to be restored and the latched acknowledge bit needs to be cleared to enable a lower level priority interrupt request on exit.

Numerous additional modifications and variations of the present invention are possible in light of the above teachings. It is therefore to be understood that within the scope of the appended claims, the invention may be practiced otherwise than as described herein.

What is claimed is:

1. An apparatus for resolving interrupt requests, comprising:
    a selector circuit for receiving a plurality of interrupt requests of different types and producing a single output for each type;
    a plurality of arbitrator circuits, each receiving an output from said selector circuit;
    an interrupt vector for storing interrupt service addresses corresponding to each interrupt request and supplying said addresses to said arbitrator;
    said arbitrators producing an output signal indicating the interrupt request having the highest priority and the interrupt service address associated therewith.

2. The apparatus according to claim 1, wherein each of said arbitrators includes a priority resolve circuit for determining the highest priority request among the inputs and an interrupt vector selector for selecting the address interrupt service associated therewith.

3. The apparatus according to claim 2, further comprising an interrupt acknowledge status latch for receiving an input latch strobe and an input clear strobe and producing an output to said priority resolve circuit to mask lower priority interrupt requests.

4. The apparatus according to claim 2, further comprising a data selector for receiving outputs from said arbitrators and selecting in response thereto an output which is selected from said addresses from said arbitrators and an input from a memory.

5. The apparatus according to claim 2, further comprising a data selector for receiving said interrupt outputs from said arbitrators and an input from a memory and selecting an output from one of said memory input and branch instructions corresponding to said addresses from said arbitrators.

6. The apparatus according to claim 5, further comprising a plurality of subtraction circuits receiving corresponding address outputs from said arbitrators and subtracting a fixed value to produce an output, said output being stored as part of one of said branch instructions, the remaining part of said branch instruction being an "always branch without link" instruction.

7. A method of resolving interrupt requests, comprising:
    receiving said interrupt requests of different kinds;
    producing a plurality of outputs, each having interrupt requests of only a single kind;
    storing interrupt service program addresses corresponding to said interrupt requests;
    selecting one request, for each kind of request, and producing a first output indicating the request and a second output indicating a corresponding address.

8. The method according to claim 7, wherein the selecting step includes;
    receiving requests of one kind;
    determining one request based on priority, and producing said first output;
    selecting one address from a series of addresses from an interrupt vector based on said selected interrupt to produce said second output.

9. The method according to claim 8, further comprising masking lower priority interrupt requests to resolve multi-level interrupts.

10. The method according to claim 8, further comprising selecting one from said second outputs and DATA from memory to form an output based on said plurality of first outputs, wherein said output causes a jump to an interrupt routine using a branch and exchange instruction.

11. The method according to claim 8, further comprising selecting one from data from memory and a plurality of branch instructions to produce an output based on said first outputs.

12. The method according to claim 11, wherein said second outputs have subtracted therefrom a fixed value to produce part of said branch instruction.

* * * * *